US010267277B2

(12) United States Patent
Estepp et al.

(10) Patent No.: US 10,267,277 B2
(45) Date of Patent: Apr. 23, 2019

(54) FUEL FILTER EMPLOYING ONE OR MORE LAYERS OF WETLAID SYNTHETIC FIBERS

(71) Applicant: Delstar Technologies, Inc., Middletown, DE (US)

(72) Inventors: Dale Ray Estepp, Smyrna, DE (US); Andrew Gordon Platt, Middletown, DE (US)

(73) Assignee: Delstar Technologies, Inc., Middletown, DE (US)

( * ) Notice: Subject to any disclaimer, the term of this patent is extended or adjusted under 35 U.S.C. 154(b) by 0 days.

(21) Appl. No.: 15/299,594

(22) Filed: Oct. 21, 2016

(65) Prior Publication Data

US 2017/0114762 A1  Apr. 27, 2017

Related U.S. Application Data

(60) Provisional application No. 62/244,448, filed on Oct. 21, 2015.

(51) Int. Cl.
| | |
|---|---|
| *F02M 37/22* | (2006.01) |
| *B01D 29/05* | (2006.01) |
| *B01D 29/56* | (2006.01) |
| *B01D 29/01* | (2006.01) |
| *B01D 35/00* | (2006.01) |
| *B01D 35/027* | (2006.01) |
| *B01D 35/26* | (2006.01) |
| *B01D 39/16* | (2006.01) |

(52) U.S. Cl.
CPC .......... *F02M 37/22* (2013.01); *B01D 29/016* (2013.01); *B01D 29/05* (2013.01); *B01D 29/56* (2013.01); *B01D 35/005* (2013.01); *B01D 35/0273* (2013.01); *B01D 35/26* (2013.01); *B01D 39/1623* (2013.01); *B01D 2201/0407* (2013.01); *B01D 2201/0415* (2013.01); *B01D 2239/065* (2013.01); *B01D 2239/0627* (2013.01)

(58) Field of Classification Search
CPC ...... F02M 37/22; B01D 29/016; B01D 29/56; B01D 29/05; B01D 35/005; B01D 2201/0415; B01D 2201/0407
USPC ....... 210/335, 490–492, 172.2, 172.4, 172.6, 210/416.4
See application file for complete search history.

(56) References Cited

U.S. PATENT DOCUMENTS

| | | | |
|---|---|---|---|
| 5,902,480 A | * | 5/1999 | Chilton ................ B01D 29/012 210/317 |
| 7,883,562 B2 | | 2/2011 | Healey et al. |
| 8,608,817 B2 | | 12/2013 | Wertz et al. |
| 2010/0000411 A1 | | 1/2010 | Wertz et al. |
| 2012/0238170 A1 | | 9/2012 | Weisman et al. |

(Continued)

FOREIGN PATENT DOCUMENTS

WO    2006135703 A2    12/2006

*Primary Examiner* — Madeline Gonzalez
(74) *Attorney, Agent, or Firm* — Caesar Rivise, PC

(57) ABSTRACT

An in tank depth media fuel filter assembly includes a closed body having an interior and an exterior. The closed body has a first composite panel of filtration media and a second composite panel of filtration media. Each of the composite panels includes and outer support layer and at least three inner layers of filtration material including at least two spunbonded layers of synthetic filaments and at least one layer of wetlaid synthetic fibers. An opening is provided in the body for providing fluid communication with the interior thereof.

10 Claims, 5 Drawing Sheets

(56) References Cited

U.S. PATENT DOCUMENTS

| | | |
|---|---|---|
| 2013/0092639 A1 | 4/2013 | Harp et al. |
| 2013/0341290 A1* | 12/2013 | Yu .................... B01D 39/163 210/767 |
| 2014/0014573 A1* | 1/2014 | Hosoya ................ B32B 5/26 210/491 |
| 2014/0102974 A1 | 4/2014 | Harp |
| 2014/0224727 A1 | 8/2014 | Yu et al. |

* cited by examiner

FUEL FILTER EMPLOYING ONE OR MORE LAYERS OF WETLAID SYNTHETIC FIBERS

CROSS-REFERENCE TO RELATED APPLICATION

This application claims the benefit under 35 U.S.C. § 119(e) of U.S. patent application Ser. No. 62/244,448, filed Oct. 21, 2015, entitled FUEL FILTER EMPLOYING ONE OR MORE LAYERS OF WETLAID SYNTHETIC FIBERS, the disclosure of which is incorporated by reference herein.

FIELD OF THE INVENTION

This invention relates generally to a fuel filter and more specifically to an in-tank depth media fuel filter assembly mounted within a vehicular fuel-containing compartment for filtering fuel, e.g., gasoline.

BACKGROUND OF THE INVENTION

In-tank fuel filters are known in the art, e.g., U.S. Pat. No. 5,902,480. Commercially available in-tank fuel filters known to applicant typically include an outer covering or support layer in the form of a non-woven mesh fabric and one or more layers of filtration material, including one or more layers of spunbonded filaments, melt-blown filaments or needle-punched synthetic fibers.

The in-tank fuel filters disclosed in the above-referenced '480 patent include an extruded, bi-planar mesh covering or support layer and layers of spunbonded filaments and/or melt-blown filaments. One commercially filter disclosed in the '480 patent includes an extruded mesh covering or support layer and internal filtration layers including three layers of Nylon meltblown filaments sandwiched between layers of spunbonded filaments. The three layers of melt blown filaments include outer layers each having a thickness of 17 mils and an intermediate or central layer having a thickness of 15 mils. In this commercial embodiment the meltblown layers provide a gradient filter material; having increased tightness from the outside in. In other words, the pore size is the greatest in the meltblown layer that first encounters the fuel to be filtered; with the pore size decreasing in each, subsequent meltblown layer.

While this latter commercial filter is generally satisfactory for its intended use a need exists for a high efficiency filter structure having improved dust retaining capacity. Such an improved filter structure is capable of removing a desired level of particulates from the fuel over a longer period of time than the above-identified commercial filter structure disclosed in the '480 patent. This prior art structure, which includes only spunbond layers and meltblown layers as the filter components, is sometimes referred to or identified herein as "Prior Art Structure."

In accordance with an improved prior art structure, the outer layer is the same bi-planar extruded mesh covering or support layer as in the Prior Art Structure and the filter layers include the following, in a direction inwardly from the outer layer: (1) a Nylon spunbonded layer (same as in Prior Art Structure), (2) two layers of Nylon meltblown filaments (same as in Prior Art Structure), (3) a bi-planar extruded mesh being thicker and more open than the covering or support layer, (4) a Nylon meltblown layer (same as in Prior Art Structure) and (5) a Nylon spunbonded layer (same as in Prior Art Structure). In this improved prior art structure the meltblown layer upstream of the bi-planar extruded mesh layer collapses into the pores of the extruded mesh to provide pockets that increase the dust holding capacity relative to the prior art structure that omits the internal, bi-planar extruded mesh layer. This improved structure is sometimes referred to or identified as "Improved Prior Art Structure."

However, in spite of the relative effectiveness of the Prior Art Structure and the Improved Prior Art Structure, a further improvement in dust holding capacity is desired, without sacrificing filter efficiency. It is to such a filter structure that the present invention relates.

It also has been disclosed to form a fuel filter with one or more layers of fibrillated fibers and employing one or more layers of wet-laid synthetic or organic fibers. For example, see U.S. Publication No. 2014/0224727.

Although filters employing various combinations of fibrillated and non-fibrillated fibers are disclosed in the '727 publication, there is no teaching or suggestion of the structure of the in-tank filters of the present invention and the benefits derived therefrom.

The following additional patents and publications are of general background interest:
U.S. Publication No. 2010/0000411
U.S. Publication No. 2012/0238170
U.S. Publication No. 2013/0092639
U.S. Publication No. 2014/0102974
International Publication WO 2006/135703
U.S. Pat. No. 7,883,562
U.S. Pat. No. 8,608,817

The above-identified patents and published applications, including the international publication, are fully incorporated by reference herein.

SUMMARY OF THE INVENTION

An in tank depth media fuel filter assembly in accordance with this invention comprising, in combination, a closed body having an interior and an exterior. The closed body has a first composite panel of filtration media and a second composite panel of filtration media. Each of the composite panels includes an outer support layer and at least three inner layers of filtration material including at least two spunbonded layers of filaments and at least one layer of wetlaid synthetic fibers between the two spunbonded layers. An opening is included in the body for providing fluid communication between the fluid to be filtered and the interior of the body.

In the most preferred embodiment the filtration material in each composite panel includes at least two spunbonded layers and multiple layers of uncalendered wetlaid synthetic fibers between at least two spunbonded layers.

In a preferred embodiment of this invention, each composite panel includes at least one spunbonded layer of synthetic filaments on each side of one or more layers of uncalendered wetlaid synthetic fibers.

In a preferred embodiment of this invention the spunbonded layer includes polyamide filaments and the synthetic fibers in the wetlaid layer are polyester fibers.

In preferred embodiments of this invention each spunbonded layer has a thickness in the range of 0.25 to 1 millimeter and each of the layers of wetlaid fibers is uncalendered and the total or combined thickness of said layers is in the range of 60 to 90 mils.

In the most preferred embodiments of this invention the filtration material does not include any layers of melt blown fibers.

In accordance with preferred embodiments of this invention the support layer either is an extruded, apertured nonwoven film or an extruded, mesh film.

The in-tank filter in accordance with the most preferred embodiment of this invention has an extremely high efficiency; retaining in excess of 95% particulates having an average particle size of 40 microns or less and a holding capacity of almost three times the holding capacity of the Prior Art Structure employing layers of spunbonded filaments and melt blown filaments, and more than the holding capacity of the Improved Prior Art Structure.

Other objects and advantages of this invention will become apparent from the following description of the preferred embodiments of this invention taken in conjunction with the drawings, wherein:

DESCRIPTION OF THE PREFERRED AND ALTERNATIVE EMBODIMENTS

Figure 1:
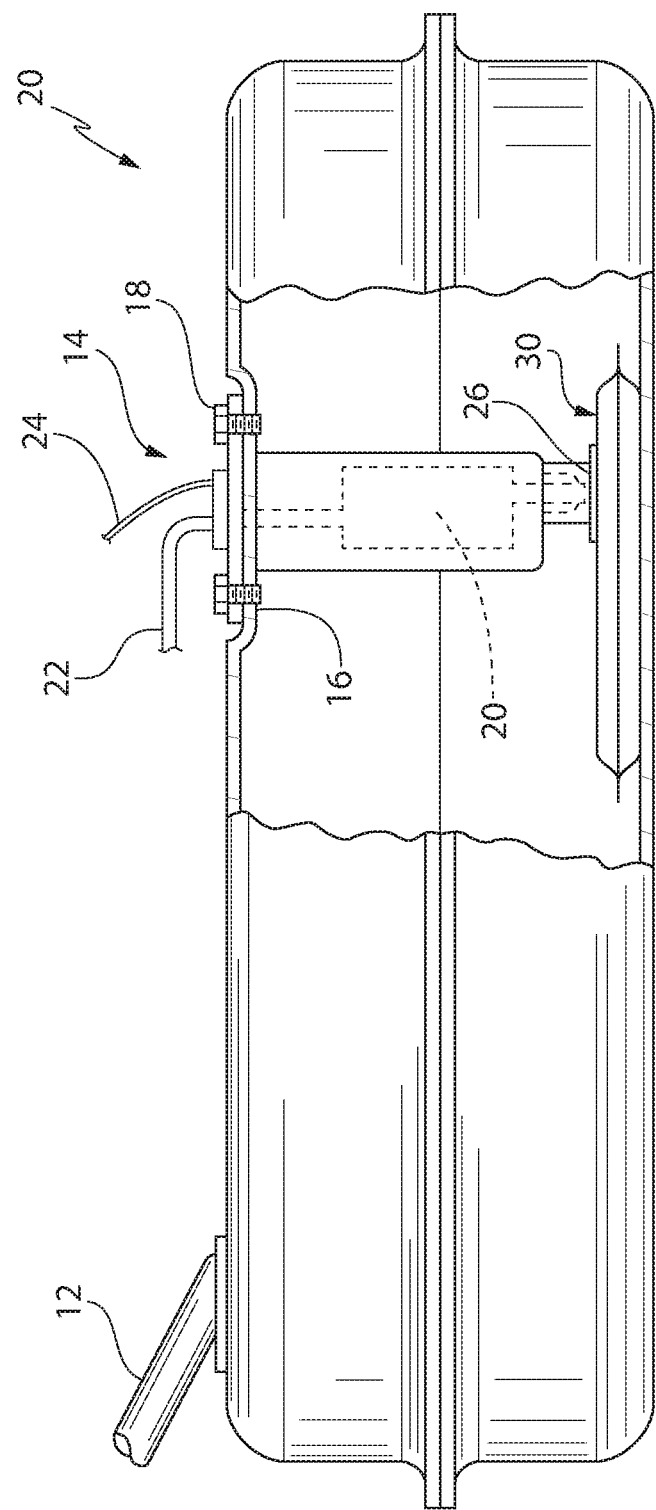
FIG. 1 is a diagrammatic, side elevational view, with portions broken away, of a vehicle fuel tank including an in-tank fuel filter in accordance with the present invention.

Referring to FIG. 1, a typical vehicle fuel tank is designated at 10. This fuel tank 10 typically is fabricated of formed, welded metal, blow molded plastic or a similar substantially rigid and fuel resistant material. The vehicle fuel tank 10 is a well-known structure including an inlet or filler tube 12, which receives fuel such as gasoline, gasohol, diesel fuel or other, alternative fuel from a source exterior to the vehicle (not illustrated) and directs it to the interior of the vehicle fuel tank 10. The vehicle fuel tank 10 also typically includes an electric fuel pump module 14, which is sealingly mounted within an opening 16 in the vehicle fuel tank 10 and may be secured thereto by a plurality of threaded fasteners 18 or other securement means. The electric fuel pump module 14 preferably includes an electric fuel pump 20 and may include a fuel level sensor assembly (not illustrated). The fuel pump 20 provides fuel under pressure to a fuel outlet or supply line 22, which communicates with the engine (not illustrated) of the vehicle. An electrical cable 24 having one or two conductors provides electrical energy to the fuel pump 20 in accordance with conventional practice.

Figure 2:
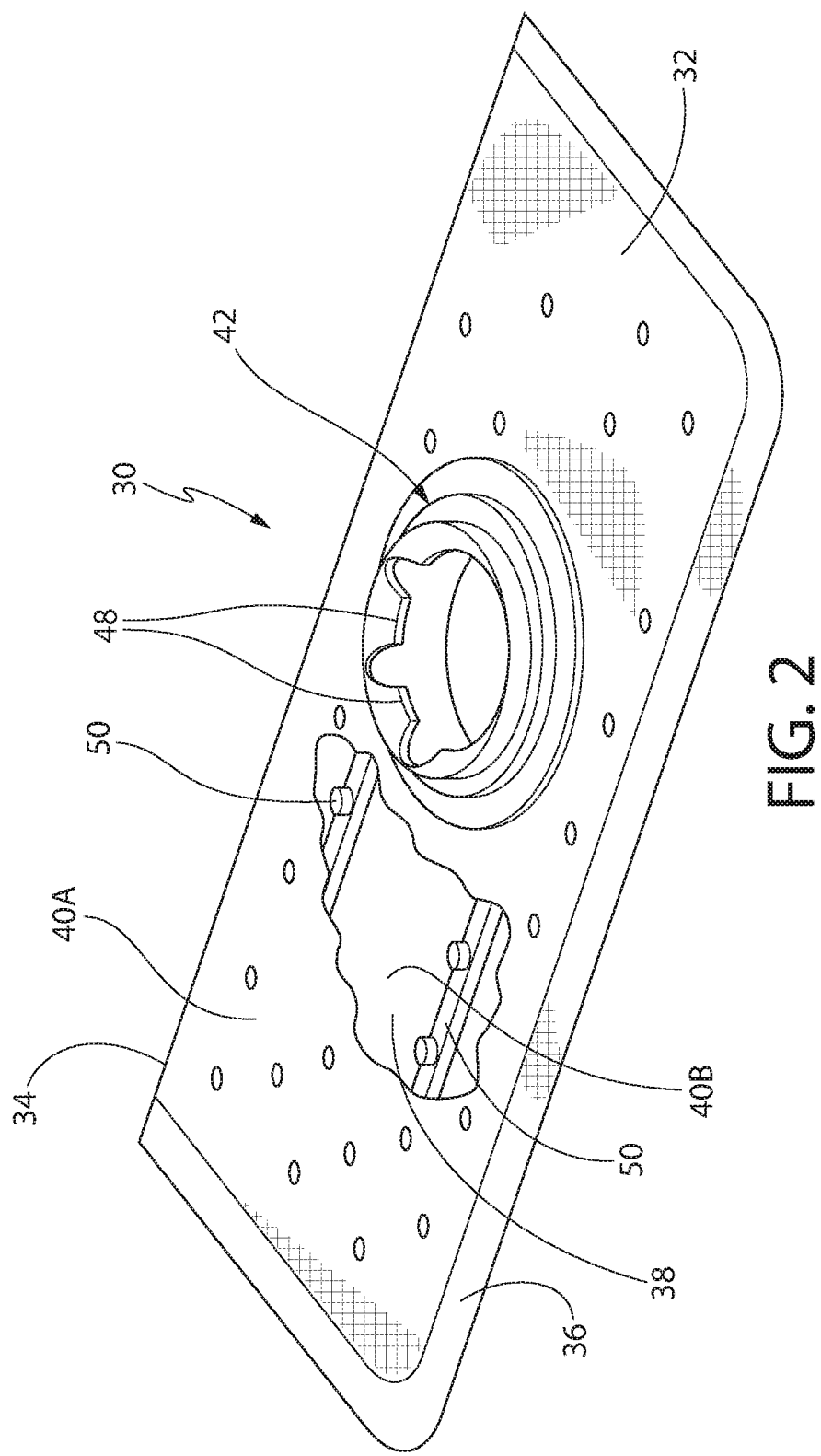
FIG. 2 is an isometric view of an in-tank fuel filter with parts broken away to show details of construction.

Referring to FIGS. 1 and 2, the electric fuel pump module 14 also includes a depending, preferably hollow cylindrical suction or inlet fitting 26, which defines an inlet opening in fluid communication with the suction side of the fuel pump 20. The cylindrical inlet fitting 26 receives and retains an in-tank fuel filter assembly 30 according to the present invention.

The vehicular fuel tank 10 and associated elements, e.g., fuel pump module 14, electric fuel pump 20, supply line 22, electrical cable 24, etc. are well known in the art and do not constitute a limitation on the present invention. However, the above description of the vehicular fuel tank 10 clearly identifies the operation environment of the in-tank fuel filter assembly 30.

Figure 3:
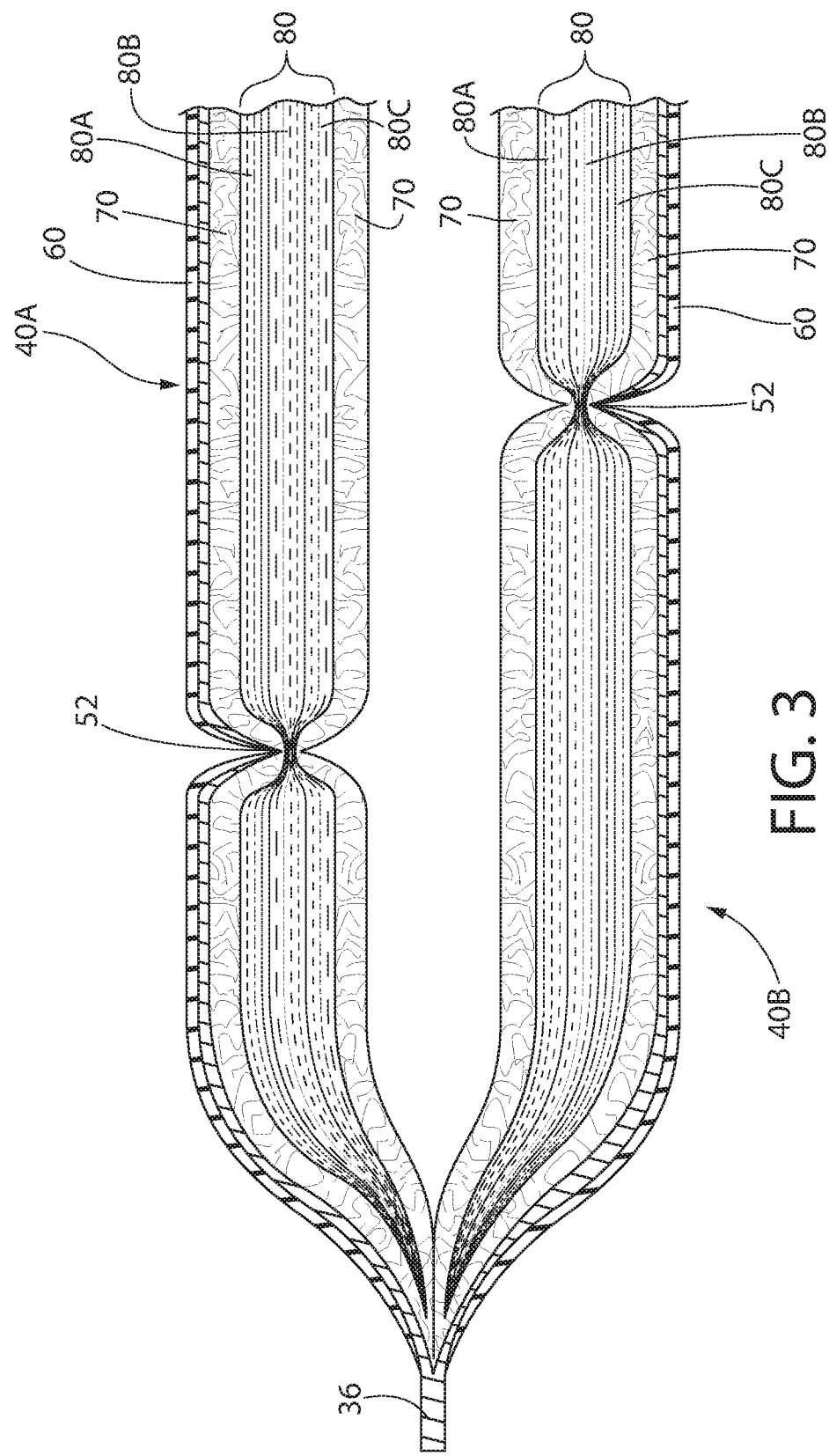
FIG. 3 is a fragmentary, enlarged, cross sectional view of the upper and lower panels of an in-tank fuel filter according to the present invention.

Turning to FIG. 3, the in-tank fuel filter assembly 30 includes a body 32 comprising a preferably folded swatch of multi-layer or composite filtration media having a single elongate fold line 34 and a partial peripheral seam or seal 36. The body 32 preferably is rectangular and may be formed of a single swatch of composite filtration media folded along the fold line 34. Three of the edges may include an edge or peripheral seam or seal 36. Alternatively, the body 32 may define a triangular, other polygonal shape (e.g., square, pentagonal or hexagonal) having N edges or an irregular shape with at least one straight edge, in which case one edge is folded and the N-1 remaining edges, or non-folded regions, are closed by a seam or seal 36. As a further alternative, the body 32 may comprise a pair of equal size filtration media swatches of any convenient or desired regular shape such as round or oval or irregular shape which may be sealed together entirely around their aligned, adjacent peripheries along an edge seal 36. In all cases, the body 32 forms an interior space 38 which, but for an outlet fitting, is closed and comprises a first or upper composite panel 40A and a second or lower composite panel 40B.

Referring to FIG. 2, an outlet fitting 42 is centrally disposed on the first or upper composite panel 40A of the fuel filter assembly 30. The outlet fitting 42 preferably is circular and includes a spring metal mounting and retaining washer 46 having a plurality of circumferentially arranged radial inwardly extending spring tabs 48. The mounting and retaining washer 46 removably or semi-permanently secure the fuel filter assembly 30 to the inlet fitting 26 of the fuel pump 20. Alternatively, spring clips, mounting ears, latches or retaining tabs formed on the outlet fitting 42 may cooperate with complementarily configured features on the inlet fitting 26 to secure the fuel filter 30 thereto. The above features shown in FIG. 2 are known in the prior art.

Still referring to FIG. 2, the outlet fitting 42 preferably is fabricated of nylon or other fuel tolerant and impervious material such as acetal or polyester and preferably is molded in-situ on the upper composite panel 40A of the fuel filter assembly 30. The outlet fitting 42 may also be assembled from two or more interengageable parts. Also preferably molded in-situ to the second or lower composite panel 40B of the fuel filter assembly 30 are one or more runners, ribs or separators 50 having sufficient internal height above the interior (upper) surface of the lower panel 40B to maintain separation of the interior surfaces of the upper and lower composite panels 40A and 40B of the filter assembly 30 such that the interior space 38 is maintained and fuel flow therebetween and into the outlet fitting 42 is facilitated. Alternatively, of course, the runners, ribs or separators 50 may be in-situ molded, either with or independently of the outlet fitting 42, on the first or upper composite panel 40A to achieve such separation and facilitate fuel flow. All of the above features are fully disclosed in the '480 patent, which already has been incorporated fully into this application.

In FIG. 3, a cross sectional view of the upper panel 40A and the lower composite panel 40B of the filter assembly 30 of the present invention is shown. It should be understood that while the composite panels 40A and 40B are identical, they are oriented oppositely or in mirror image, i.e., the top (outside) layer of the upper composite panel 40A is the same as the bottom (outside) layer of the lower composite panel 40B and so on. Thus, while only the upper composite panel 40A of the preferred and alternate embodiments will be specifically described herein, it should be appreciated that, with the foregoing qualification, the description of one applies equally to the other. Furthermore, both the upper and lower composite panels 40A and 40B are preferably sonically point-bonded to provide spaced apart regions of connected or coupled filaments evidenced by the compressed regions 52 illustrated in FIG. 2.

The upper composite panel 40A preferably includes at least four distinct layers of material. The outer, upper exterior shell or layer 60 is a relatively coarse extruded mesh of any suitable fuel tolerant and impervious material, e.g. nylon, polyester, acetal or Teflon. Teflon is a registered trademark of the E. I. DuPont de Nemours Co. The relative coarseness means that the exterior layer 60 contributes relatively little to the fuel filtration process except on the largest scale. Rather, the extruded mesh of the exterior layer 60 provides an exceptionally stable and abrasion resistant outer covering for the fuel filter assembly 30. Alternatively the upper, exterior shell or layer 60 can be formed of any other nonwoven, porous material capable of providing the desired supporting and fuel transmitting properties of the in-tank filter assembly. For example, the exterior layer 60 can be formed of a non-woven fabric in the form of an extruded, apertured film.

When the exterior layer 60 is extruded as a mesh fabric, it has the appearance of a woven fabric with warp and woof filaments, as is well known in the art and as is fully illustrated in the '480 patent already made of record herein. In this mesh structure the warp filaments and woof filaments are connected as a result of being integrally formed at each intersection in the extrusion process. This results in the exterior shell or layer 60 of extruded mesh having exceptional dimensional stability due its resistance to pantographing and exceptional ruggedness due to the strength of the mesh and its excellent abrasion resistance. As used here, the term pantographing refers to the tendency or ability of swatches of woven material to distort and collapse like a pantograph when sides of the swatch are pulled or pushed. The interstices in a preferred extruded mesh exterior layer are diamond shaped and preferably about 500 microns by 900 microns. This opening size is not critical, however, and the size may readily be varied by 25 percent or more. All of the features of the mesh exterior layer 60 are fully disclosed in the '480 patent, which has been incorporated fully into this application.

Referring to FIG. 3, a pair of fine, non-woven filtration layers 70 preferably are formed from spunbonded Nylon filaments but may be formed from other spunbonded synthetic filaments such as filaments made of polyester, acetal, Teflon or other stable, fuel impervious material. As utilized herein, the terms spunbonded material and spunbonded filtration media refer to that class of non-woven materials wherein the filaments are cooled by the application of cold air immediately upon forming to stop attenuation thereof.

Typically, the spunbonded filaments are substantially flat; having a thickness in the range of 3 mils. However, in accordance with the broadest aspects of this invention the thickness and form, e.g., shape of the spunbonded filaments can be varied. Each spunbond layer 70 illustrated in FIG. 3 preferably has a nominal uncompressed thickness on the order of 0.5 millimeters though such thickness may vary from less than about 0.25 millimeters to up to about 1 millimeter or thicker depending upon production and application variables.

Disposed within or between the two layers 70 of spunbonded filaments are one or more intermediate, wetlaid layers 80 of non-woven synthetic fibers. These wetlaid layers 80 preferably are uncompressed, or uncalendered.

As illustrated in FIG. 3, three wetlaid layers 80 of non-woven synthetic fibers are illustrated at 80a, 80b and 80c. These layers are identical to each other. The number of layers employed in this invention is dictated by the total desired thickness of the wetlaid layers(s) and the formation equipment that is available to manufacture such layers. In a preferred embodiment of this invention the desired thickness of each of the layers 80a, 80b and 80c is approximately 30 mils; providing a total thickness of 90 mils for the uncompressed wetlaid layers. However, in accordance with the broadest aspects of this invention the number of layers of wetlaid fibers, the thickness of each of the layers and the total thickness of the wetlaid layers can be varied depending upon the environment of use. For example, and not by way of limitations, each of the layers may be 20 mils thick; providing a total thickness of 60 mils for the three layers.

In the most preferred embodiments of this invention three, uncalendered wetlaid layers of non-woven synthetic fibers, each having a thickness of 30 mils, are disposed between single layers 70 of spunbonded filaments, each spunbond layer 70 having a nominal uncompressed thickness of the order of 0.5 millimeters. However, if desired, multiple layers 70 of spunbonded synthetic filaments can be employed. Moreover, the uncompressed thickness of the spunbond layers can be varied, and preferably is in the range of 0.25 to 1 millimeter.

Most preferably each of the wetlaid layers 80a, 80b and 80c is formed from polyester fibers; however, other synthetic fibers can be employed to form the wetlaid layers if desired. Applicants have achieved excellent results employing three wetlaid, uncalendered layers of polyester fibers, each layer having an uncalendered thickness of 30 mils. The preferred polyester fibers are PET fibers. Most preferably the fiber composition of the wetlaid, uncalendered layers is a blend of PET fibers including 15% 2 denier, ¼ inch length CoPET/PET110 and 85% 1.5 denier, ¼ inch length drawn PET fibers It is believed that if the desired thickness of the uncompressed wetlaid layers could be provided as a single layer such a structure would also possess the benefits of the invention, as compared to the prior art commercial filter employing three layers of meltblown synthetic fibers between the aforementioned spunbond layers 70 as is described below.

The in-tank filter structure employed in the comparative testing discussed later herein has the structure shown in FIG. 3, with each of the three wetlaid layers including the above-identified polyester fibers and having a thickness of 30 mils, and with the single layers of Nylon spunbonded filaments on each side of the wetlaid layers having a nominal uncompressed thickness of 0.5 millimeters. Each of the wetlaid layers has substantially the same pore size, i.e., the filter that is the subject of comparative testing is not a gradient filter. However, gradient filters are within the scope of the broadest aspects of this invention.

This in-tank filter structure 30 includes upper and lower panels 40A and 40B; each including an outer or exterior layer or shell 60 of bi-planar, extruded mesh and two layers 70 of spunbonded material sandwiching the intermediate layers 80a, 80b and 80c of the above identified uncalendered wetlaid layers formed of synthetic fibers; preferably polyester. The interstitial or pore sizes of the layers 70 and 80 are correspondingly larger and smaller. This graduated pore size has the effect of first filtering out larger particulate matter in the first layer 70 of spunbonded material and then filtering out smaller particulate matter in the intermediate layer(s) 80 of uncalendered wetlaid synthetic fibers. Due to the relatively large size of the pores or interstices of the bi-planar extruded mesh outer layer 60, it contributes to the filtration process only on the largest scale. The bi-planar extruded mesh material is commercially available from Applicant and is sold under the trademark Naltex.

Figure 4:
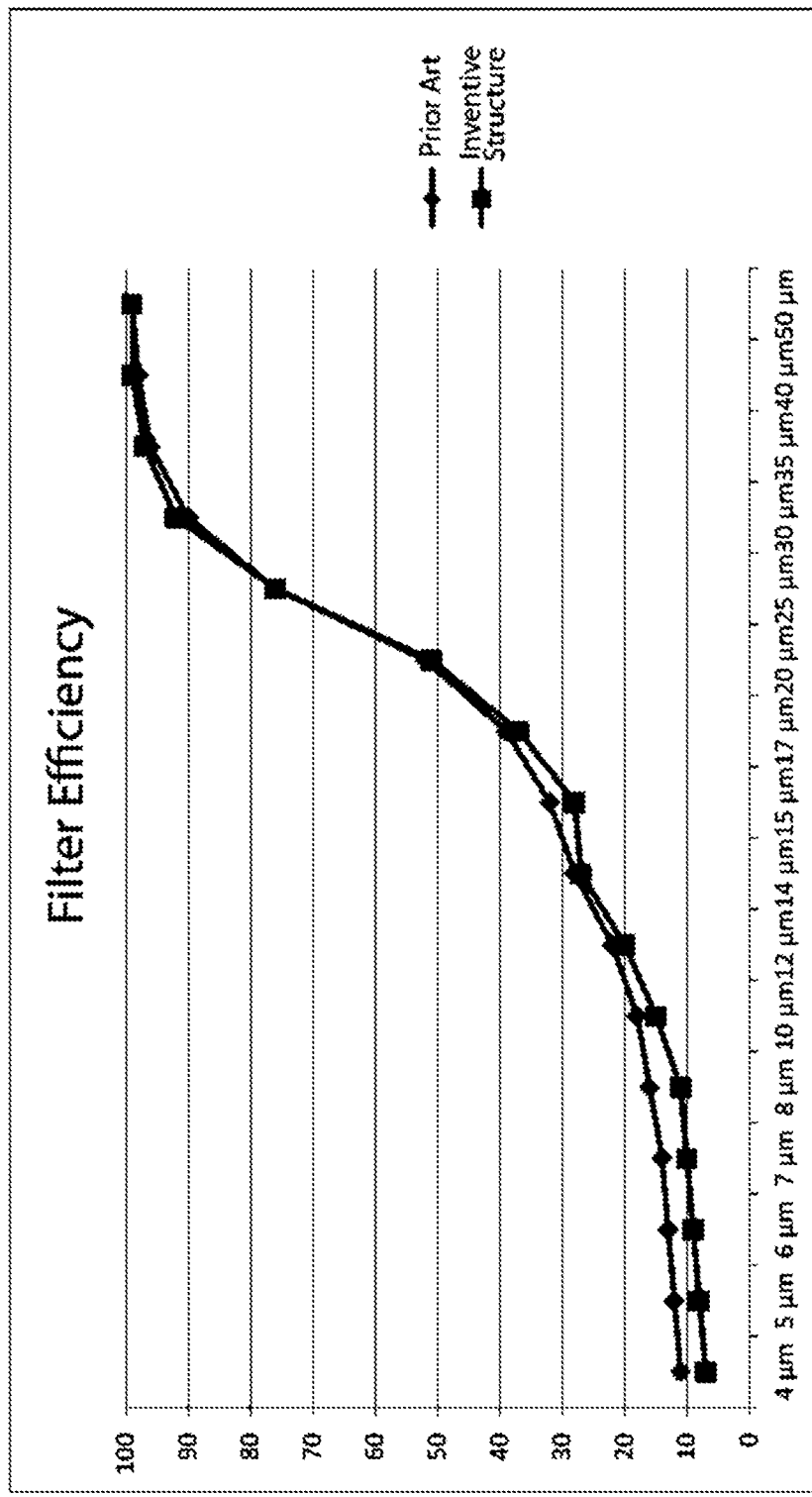
FIG. 4 is a graph comparing fuel efficiency of the present invention with the prior art.

Applicant has discovered that the in-tank filters of this invention and the prior art in-tank filters employing layers of melt blown filaments have substantially the same efficiency in removing undesired particulates from fuel. Specifically, by way of example the present invention and the prior art commercial in-tank filter structures are capable of removing approximately 98% of particulates having a size of 40 microns, as is shown in FIG. 4.

Figure 5:
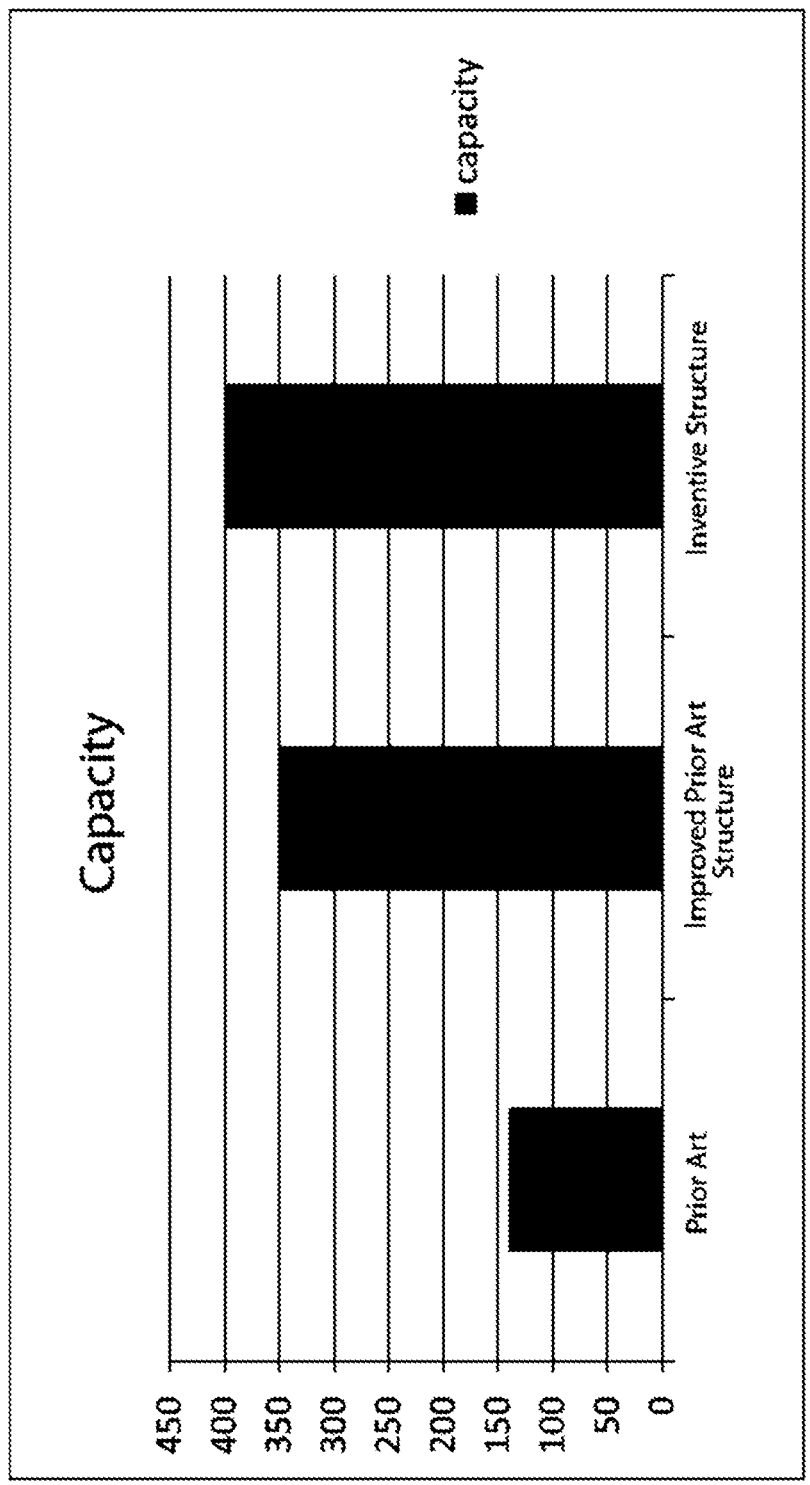
FIG. 5 is a graph comparing dust holding capacity of the present invention with prior art structures.

The efficiency percentages were determined by ISO 4548-12/ISO 16889/ISO 19438 (Multipass) Testing Service. However, the present invention has a far superior particle or dust holding capacity than the Prior Art Structure (identified earlier herein). As shown in FIG. 5, the inventive structure has a dust holding capacity of approximately 400 mg/in2; almost three times the approximate dust holding capacity of 140 mg/in$^2$ for the Prior Art Structure.

As also can be seen in FIG. 5, the dust holding capacity of the inventive structure is greater than the dust holding capacity of the Improved Prior Art Structure and achieves this benefit in a less complex construction than the Improved Prior Art Structure. Specifically, the dust holding capacity of the Improved Prior Art Structure is approximately 350 mg/in$^2$, which is substantially less than the 400 mg/in$^2$ holding capacity achieved in the structure of the present invention.

The dust holding capacity was determined in accordance with SAE J905.

The foregoing disclosure is the best mode devised by the inventors for practicing this invention. It is apparent, however, that filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What we claim as our invention is the following:

1. An in tank depth media fuel filter assembly comprising, in combination, a closed body having an interior and an exterior, said closed body having a first composite panel of filtration media and a second composite panel of filtration media, each of said composite panels comprising and outer support layer and at least three inner layers of filtration material, said three inner layers being free of layers of meltblown fibers and including at least two spunbonded layers of synthetic filaments and at least one layer of wetlaid synthetic fibers, an opening in said body for providing fuel communication with the interior of said body.

2. The fuel filter of claim 1, wherein said at least one layer of wetlaid synthetic fibers is uncalendered and is disposed between spunbonded layers of synthetic filaments in each of said composite panels.

3. The fuel filter of claim 1, including at least two spunbonded layers and multiple layers of uncalendered wetlaid synthetic fibers between at least two spunbonded layers of synthetic filaments.

4. The fuel filter of claim 1, wherein the synthetic filaments of the spunbonded layers include polyamide filaments.

5. The fuel filter of claim 1, wherein the wetlaid synthetic fibers are polyester fibers.

6. The fuel filter of claim 1, including at least three inner layers of filtration material, at least two of said layers being spunbonded layers of synthetic filaments and at least one of said layers being an uncalendered wetlaid synthetic fiber layer between layers of said spunbonded filaments.

7. The fuel filter of claim 1, wherein the support layer is an extruded, apertured film.

8. The fuel filter of claim 1, wherein the support layer is an extruded, mesh film.

9. The fuel filter of claim 1, wherein said at least one layer of wetlaid synthetic fibers is disposed between spunbonded layers of synthetic filaments in each of said composite panels, said spunbonded layers being outer layers of each of said composite panels.

10. The fuel filter of claim 1, wherein said at least one layer of wetlaid synthetic fibers is uncalendered and is disposed between spunbonded layers of synthetic filaments in each of said composite panels, said spunbonded layers being outer layers of each of said composite panels.

* * * * *